(12) United States Patent
Nalbandyan

(10) Patent No.: US 6,168,810 B1
(45) Date of Patent: Jan. 2, 2001

(54) METHOD AND CULTURE FOR PRODUCING CHEESE AND OTHER DAIRY PRODUCTS

(76) Inventor: Liana Nalbandyan, 50-35 38th St., suite 3L, Long Island City, NY (US) 11101

(*) Notice: Under 35 U.S.C. 154(b), the term of this patent shall be extended for 0 days.

(21) Appl. No.: 09/255,890

(22) Filed: Feb. 20, 1999

(51) Int. Cl.⁷ ..................................................... A23C 9/12
(52) U.S. Cl. ............................... 426/36; 426/34; 426/42; 426/43; 426/582; 435/404
(58) Field of Search .................. 426/34, 36, 41, 426/582, 42, 43, 580; 435/404

(56) References Cited

U.S. PATENT DOCUMENTS

| 5,378,479 | * | 1/1995 | Trecker et al. | 426/42 |
| 5,436,020 | * | 7/1995 | Kuwata et al. | 426/583 |
| 5,447,740 | * | 9/1995 | Brown | 426/580 |
| 5,554,397 | * | 9/1996 | Tanaka et al. | 426/36 |
| 5,766,657 | * | 6/1998 | Farkye et al. | 426/39 |
| 5,773,054 | * | 6/1998 | Meibach et al. | 426/36 |

OTHER PUBLICATIONS

Abdelgadir et al., 03765274 CAB Accession Number: 990403956, abstracting The Traditional Fermented Milk Products of the Sudan, International Journal of Food Microbiology, vol. 44(1/2), 1–13, 1998.*

Hawley, Condensed Chemical Dictionary, Tenth Edition, Van Nostrand Reinhold Company, New York, 39, 1981.*

Kosikowski, Cheese and Fermented Milk Foods, Edwards Brothers, Inc., Ann Arbor, MI, 276–277, 1977.*

Scott, Cheesemaking Practice, Second Edition, Elsevier Applied Science Publishers, London, 169–170, 1986.*

* cited by examiner

*Primary Examiner*—Leslie Wong
(74) *Attorney, Agent, or Firm*—Michael I. Kroll

(57) ABSTRACT

The present invention relates to a method for preparing cheese and other dairy products and more specifically to methods for preparing cheese and other dairy products from secondary milk products such as whey and buttermilk as well as cheeses which are past their expiration date for freshness and/or appearance. The process allows for reconstituting outdated cheeses into new cheeses which have acceptable organoleptic properties, and includes: washing, salting and chopping an abomasum portion of the stomach of a ruminant; adding the abomasum to whey; refrigerating the mixture; followed by filtering the mixture to yield the culture in liquid form. The culture can also include adjuncts such as grapes/raisins, salt, garlic and aluminum ammonium sulfate. The culture can be used to produce soft curd from pasteurized milk, and also for the production of other dairy products, such as butter, kefir and cottage cheese, without the need for conventional souring agents and coagulants.

8 Claims, 4 Drawing Sheets

METHOD AND CULTURE FOR PRODUCING CHEESE AND OTHER DAIRY PRODUCTS

BACKGROUND OF THE INVENTION

1. Field of the Invention

The instant invention relates generally to methods for preparing cheese and other dairy products and more specifically to methods for preparing cheese and other dairy products from secondary milk products such as whey and buttermilk as well as cheeses which are past their expiration date for freshness and/or appearance.

2. Description of the Related Art

While processes for manufacturing cheese are known in the art, these processes do not adequately address the use of outdated cheese to produce a reconstituted cheese having acceptable organoleptic properties. The following references teach generally the cheesemaking process.

U.S. Pat. No. 5,378,479 (Trecker, G. W. et al., Jan. 3, 1995) discloses a method of manufacturing a high moisture, low fat, cheddar-type cheese from skim milk.

U.S. Pat. No. 5,554,397 (Tanaka, H., Sep. 10, 1996) discloses a method for producing a cheese-type food and an aged type cheese from powdered milk as a starting point.

U.S. Pat. No. 5,766,657 (Farkye, N.Y., et al., Jun. 16, 1998) discloses a method for manufacturing a melt-controlled cheese comprising mixing a curd produced by adding acid to hot milk and a curd produced by rennet coagulation.

SUMMARY OF THE INVENTION

The present invention is concerned with methods for preparing cheese and other dairy products and more specifically to methods for preparing cheese and other dairy products from secondary milk products such as whey and buttermilk as well as cheeses which are past their expiration date for freshness and/or appearance.

A primary object of the present invention is to provide a method for reconstituting outdated cheeses into new cheeses which have acceptable organoleptic properties.

Another object of the present invention is to provide a novel culture for the production of such cheeses and other dairy products.

An additional object of the present invention is to provide a novel dairy culture and method for producing new dairy products such as cheese, butter, kefir and cottage cheese.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE PREFERRED EMBODIMENTS

Figure 1:
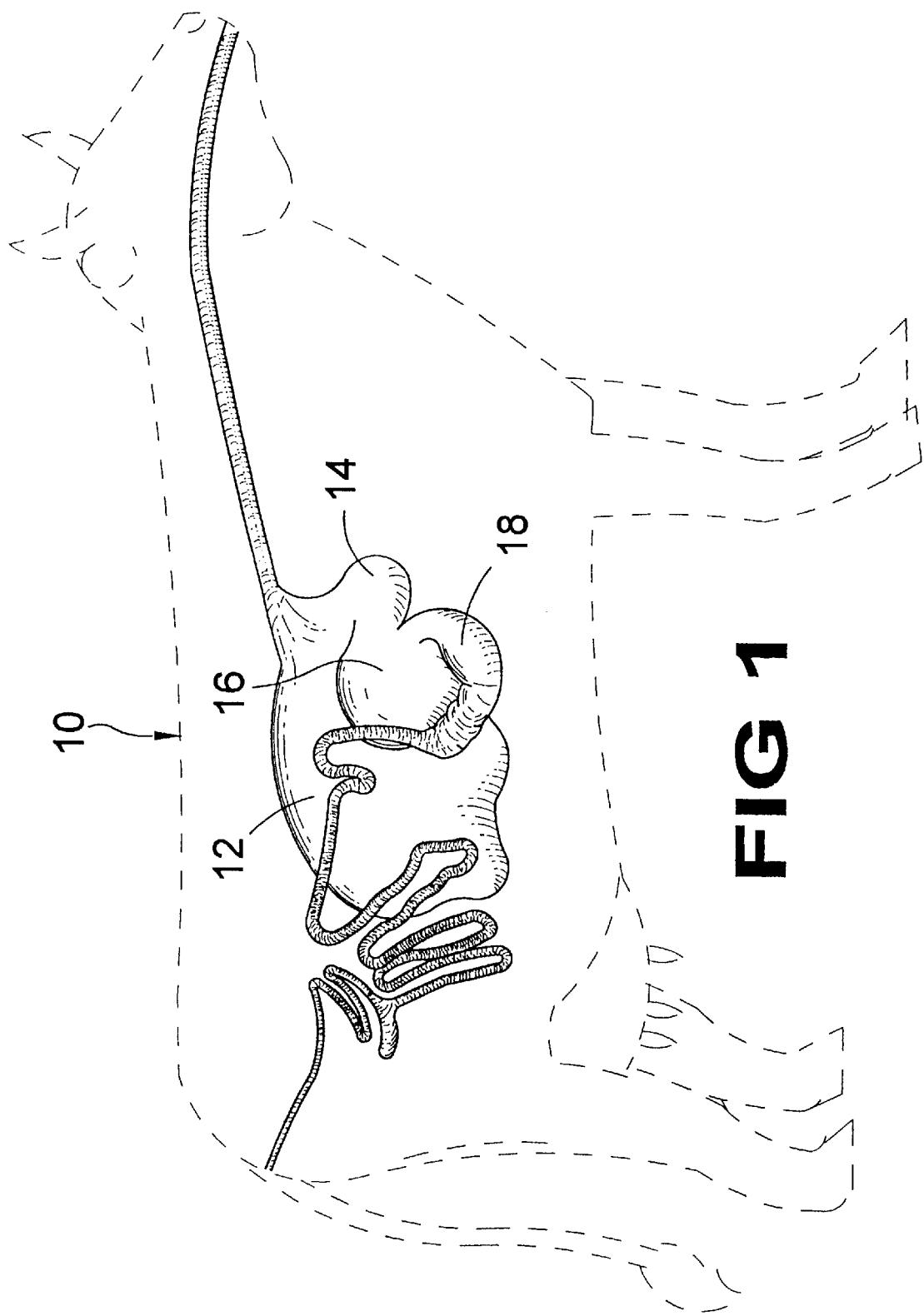
FIG. 1 is a graphic representation of a ruminant animal with the digestive system shown for reference.

Turning now descriptively to the drawings, in which similar reference characters denote similar elements throughout the several views, the Figures illustrate the inventive culture and processes for using the culture in the manufacture of cheese and other dairy products. With regard to the reference numerals used, the following numbering is used throughout the various drawing figures.

Figure 2:
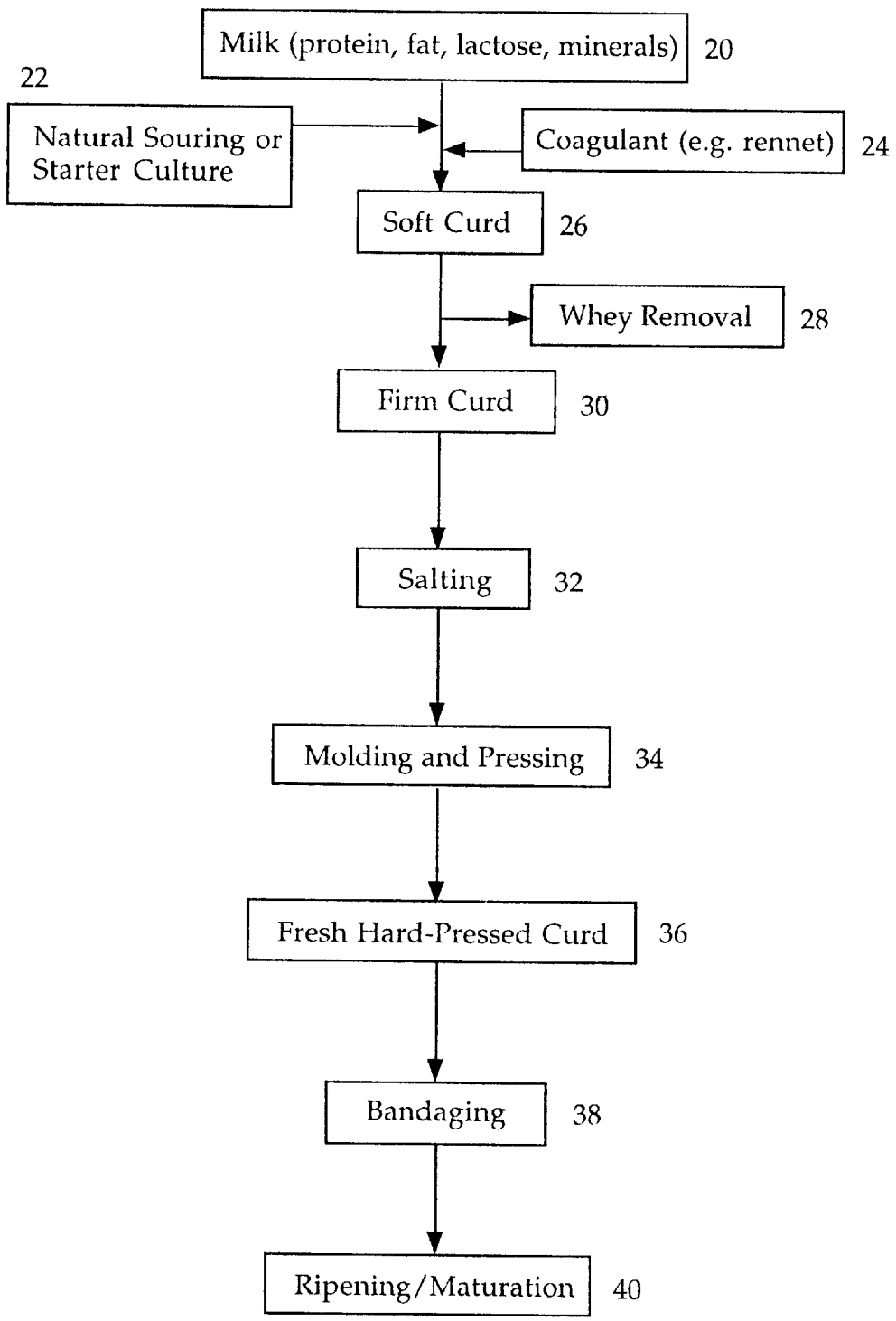
FIG. 2 is a flowchart illustrating the basic cheesemaking steps.
Figure 3:
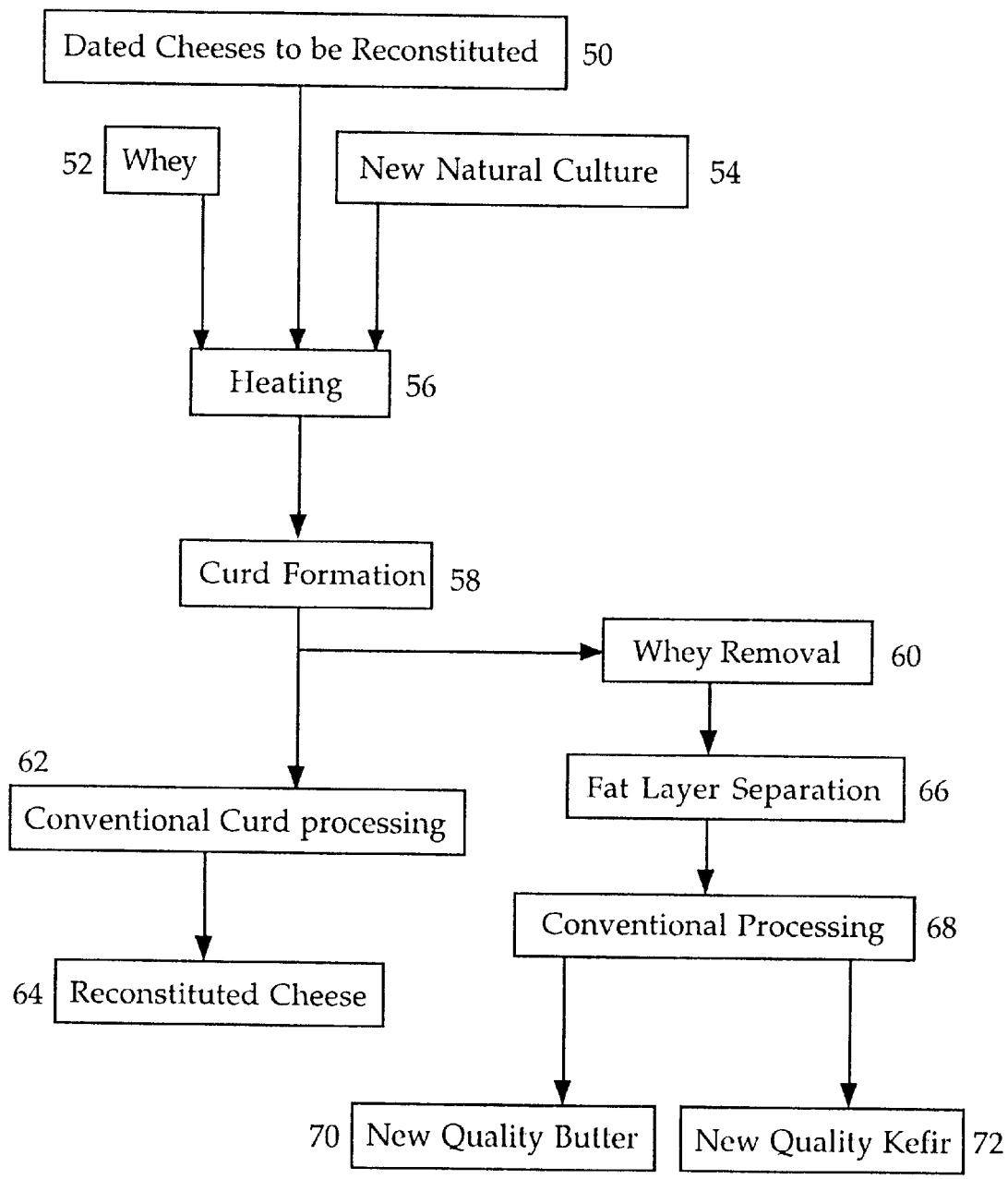
FIG. 3 is a flowchart showing the steps for reconstituting dated cheeses into new, fresh cheeses.

10 ruminant animal
12 rumen of 10
14 reticulum of 10
16 omasum of 10
18 abomasum of 10
20 milk
22 souring of 20
24 addition of coagulant to 20
26 soft curd formation from 20 due to 22 and 24
28 removal of whey from 26
30 firm curd formation due to 28
32 salting
34 molding and pressing
36 fresh hard-pressed curd as a result of 34
38 bandaging of 36
40 ripening/maturation of 36
50 dated cheeses to be reconstituted
52 whey
54 new natural culture of the present invention
56 heating of mixture of 50, 52 and 54
58 curd formation
60 removal of whey
62 conventional processing of curds
64 reconstituted cheese as a finished product
66 separation and removal of fat layer from removed whey
68 conventional processing of whey
70 new quality butter as a finished product
72 new quality kefir as a finished product
80 chopped ruminant abomasum
82 salt
84 garlic
86 raisins and/or grapes
88 Aluminum ammonium sulfate FIGS. 1 through 4 illustrate the inventive culture and processes for using the culture in the manufacture of cheese and other dairy products. FIG. 2 shows generally the various steps which may be utilized in manufacturing cheese. The process of cheesemaking is an ancient craft that dates back thousands of years, and which relies on the curdling of milk. First, the milk is carefully selected to make sure there are no antibiotics or harmful agents that could affect the process. The milk is then heated and held at a given temperature for a short period to destroy any harmful bacteria (pasteurization). Special starter cultures are then added 22 to the warm milk 20 and change a very small amount of the milk sugar into lactic acid. This acidifies the milk at a much faster rate and prepares it for the next stage. Rennet (mainly chymosin) is then added 24 to the milk and within a short time a curd is produced 26. Pepsin can be similarly utilized 24 in place of rennet for certain specialty cheeses. The resultant curd is then cut into small pieces, and heat is applied to start a shrinking process which, with the steady production of lactic acid from the starter cultures, will change it into small rice-sized grains. At a carefully chosen point the curd grains are allowed to fall to the bottom of the cheese vat, the left-over liquid, which consists of water, milk sugar and albumen (now called whey) is drained off 28 and the curd grains allowed to mat together to form large slabs of curd 30. The slabs are then milled, and salt is added 32 to provide flavor and help preserve the cheese. Later, it is molded, pressed 34, optionally bandaged 38 and subsequently packed in various sized containers for maturing 40. This is the basic method for making what is known as a hard-pressed cheese 36.

Certain hard-pressed cheese, such as Cheddar, Cheshire and the English regional cheeses including Caerphilly, undergo pressing for a period from 18 hours up to 2–3 days after being put into the cheese molds. Throughout the cheesemaking process described for Cheddar, the starter is steadily making acid, its speed in so doing reduced somewhat in the heating process used in the final stages. To stop further acid development, and also to provide an element of flavor and help preserve the final cheese, salt is added after the curd blocks are milled. The amount varies with the type of cheese made, but is usually around 1.5–3% (w/w). Salting provokes a further small rush of whey, cools the curd slightly and controls further acid development. In traditional cheese vats, the salt was added by hand after milling either in the vat or in the 'cooler' (a trolley-like vehicle on which curd blocks were cheddared and made ready for milling). However, in modern automated plants, the salt can be blown from a salt-silo directly on to the milled curd laid out on a moving bed. Mechanical probes assess the curd depth and adjust the amount of salt needed electronically.

There are also hard- and semi-hard pressed cheese that are usually salted for a much shorter time and are relatively large and small in size, respectively. A typical example would be the Edam (Dutch) and Emmental (Swiss). In this case, the cheese are removed from their mold and tumbled straight into a bath of salt solution strong enough to float the cheese. By holding these cheese in huge shallow tanks, they start absorbing salt, and after a period they are floated along to similar tanks with an even stronger salt solution during which the salt continues to be absorbed. They are then removed by elevator from the brine bath, allowed to dry out by which time the degree of salt needed has spread through the cheese.

Soft cheese types, which tend to be small, can be rubbed with salt on the outer surface at least once, and sometimes twice. The salt can then migrate across the cheese in about 24 hours. This method of salting assists in the formation of rind on the cheese.

The present invention concerns a new natural culture 54 for manufacturing cheeses and other dairy products. The inventive culture 54 can be utilized as a curdling agent 22 for conventional production methods for cheeses and other dairy products, including the production of soft curd from pasteurized milk, thus eliminating the need for ingredients (rennet, vinegar, enzymes) which are conventionally used in manufacturing dairy products. It should be noted that the new natural culture of the present invention can replace both the souring agent 22 and the coagulant 24 of the prior art processes. The inventive culture can also be used to reconstitute outdated cheeses 50 into new cheeses 64 having different, acceptable organoleptic properties.

Figure 4:
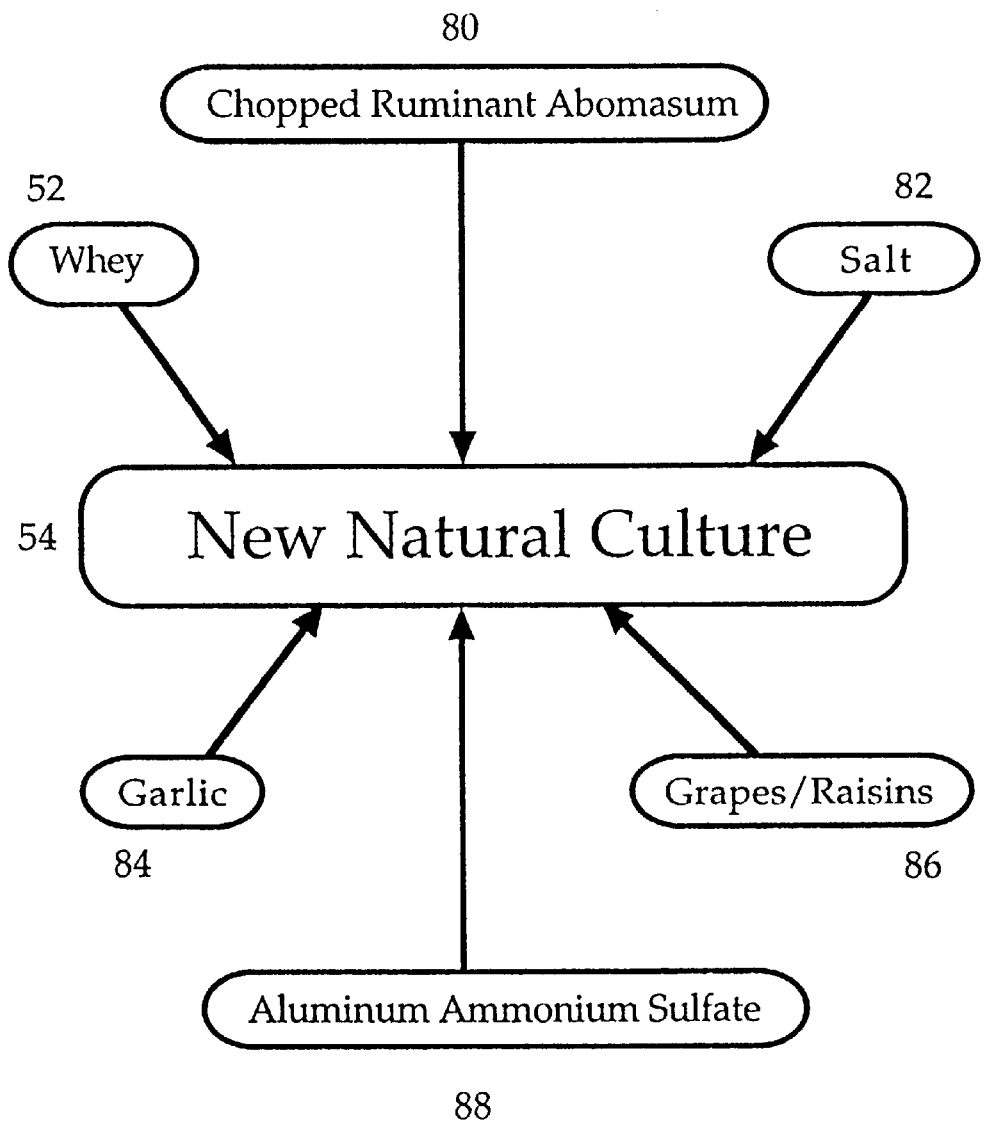
FIG. 4 is an illustration showing the various components of the culture of the present invention.

The various components of the new natural culture 54 of the invention are illustrated in FIG. 4. The base material is whey 52, also known as curd water, a common by-product of numerous dairy manufacturing processes. To the whey 52, is added the washed, chopped and optionally salted abomasum 80 of a ruminant animal 10. In ruminant animals 10, the abomasum 18 is one of the stomach chambers, the others being the rumen 12, reticulum 14 and omasum 16. The remaining components of the inventive new natural culture are salt 82, garlic 84, grapes, raisins or a combination thereof 86 and aluminum ammonium sulfate 88.

To produce the new natural culture 54 of the invention, an appropriate amount of chopped abomasum 80 is added to the whey 52, in addition to the salt 82, chopped garlic 84, grapes and/or raisins 86, and the aluminum ammonium sulfate 88. After mixing well, the mixture is placed in a closed container and stored under refrigeration. After storage, the mixture is filtered to remove any solids, and the recovered liquid may be used as the inventive new natural culture.

With regard to the relative amounts of each component of the inventive culture, it can be readily appreciated that the major component will be the whey, with the other components only providing a minor portion of the total volume of culture, particularly once the solid matter has been filtered out. For example, for each 2 gallons of whey used, it has been found that a suitable quantity of chopped abomasum can be any of: 4 abomasums of sheep; 2 abomasums of calves; or one from a mature cow with one from a sheep. Speaking generally, on a weight to volume basis, the abomasum component will be expected to be present from about 20 to about 250 grams per liter of whey, preferably from about 40 to about 200 grams per liter, and most preferably about 50 to 100 grams per liter.

The remaining components are added in even more minor amounts. Specifically, the salt can be present over a wide range of concentrations. It is anticipated that a suitable range will be from about 1 to about 20 or more grams per liter of whey, preferably from about 2 to about 5 grams per liter, and most preferably about 3 grams per liter. The aluminum ammonium sulfate $(Al_2(NH_4)_2(SO_4)_4 \cdot 24H_2O)$ will generally be added from about 1 to about 10 or more grams per liter of whey, preferably from about 1 to about 5 grams per liter, and most preferably about 3 grams per liter. The garlic will generally be utilized in the form of chopped heads of garlic, generally from about 2 to about 20 grams per liter of whey, preferably from about 3 to about 10 grams per liter, and most preferably about 5 grams per liter.

With regard to the grapes, it can be readily appreciated that either grapes or raisins may be suitably employed, with the understanding that raisins (dried grapes) will generally lose about half their original weight during the drying process. This component of the inventive culture will generally be present at a level (for fresh grapes) of from about 10 to about 200 grams per liter of whey, preferably from about 25 to about 100 grams per liter, and most preferably about 50 grams per liter. For raisins, the levels will be roughly half that for grapes. Furthermore, combinations of grapes and raisins may also be used, with the proper concentration being readily calculable as described above.

As discussed above, the inventive new natural culture may be utilized as a new culture for conventional dairy manufacturing operations requiring such culture, or can be used in the inventive process for making, or reconstituting new cheeses from dated cheeses which may have degraded flavor, appearance or texture. In this process, illustrated in FIG. 3, the dated cheese 50 is added to an excess amount of whey 52 to which has been added a minor amount of the inventive culture 54. The mixture is heated 56 until the dated cheese "melts" in the mixture, then begins to form curds as a result of the culture. The whey is then removed 60 and the curds are processed according to conventional methods 62 to produce a reconstituted cheese 64 having different, yet completely acceptable, flavor, appearance and texture characteristics.

In addition to the curds, the removed whey 60 can also be processed according to conventional methods 68 to produce a new quality products such as butter 70 and a new quality kefir 72.

With regard to the relative amounts of whey and the inventive culture, only a minor amount of culture will be adequate for the process of the invention. For example, on a volume/volume basis, a suitable range would be a proportion of culture to whey of from about 1:1000 to about 1:10,000, respectively.

In addition to cheese, the inventive new natural culture may be employed in the manufacture of other dairy products, for example, butter, kefir and cottage cheese.

EXAMPLES

Example 1

Culture Preparation

Four sheep abomasums were carefully washed, salted, chopped, and place in a closed glass container. To this, 2 gallons of whey, 400 grams of grapes, 2 teaspoons of salt, 2 chopped medium garlic heads and 20 grams of aluminum ammonium sulfate were added. The mixture was stirred thoroughly and refrigerated (2 to 8° C.) for one week. The solid matter was filtered out with a standard pore filter, leaving the inventive culture as a liquid.

Example 2

Reconstitution of Dated Cheese

To 10 gallons of whey, 2 teaspoons of the inventive culture were added and the mixture brought to a boil. Dated cheeses were added to the mixture and kept under heat until the proper density was achieved. They whey was removed and the curds processed according to conventional methods to produce a new batch of cheese with a different, and acceptable flavor and appearance.

Example 3

Butter Manufacture

The removed whey from the previous example, a milk-colored liquid, is placed in containers and stored in a cool place to allow the fat layer to come up to the surface. This layer of fat is separated and whipped until it turns into butter, which is of a totally new quality.

Example 4

Kefir Manufacture

The remaining liquid from Example 3, combined with the liquid residue of the butter product, results in a totally new quality kefir.

Example 5

Cottage Cheese Manufacture

To 10 gallons of buttermilk were added 1 tablespoon of the inventive culture. The mixture was brought to a boil, and after curdling, they whey was drained and the curd retained as a new type and quality of cottage cheese. The removed whey can be further utilized in the manufacture of other products.

Example 6

Use as Curdling Agent

To 10 gallons of pasteurized milk were added 3 tablespoons of the inventive culture. The result is a totally new type of curd which may be processed according to conventional methods.

It will be understood that each of the elements described above, or two or more together, may also find a useful application in other types of applications differing from the type described above.

While the invention has been illustrated and described as embodied in a method and culture for producing and reconstituting cheeses and other dairy products, it is not intended to be limited to the details shown, since it will be understood that various omissions, modifications, substitutions and changes in the forms and details of the formulation illustrated and in its operation can be made by those skilled in the art without departing in any way from the spirit and scope of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by letters patent is set forth in the appended claims.

I claim:

1. A process for making a culture for the manufacture of dairy products comprising the steps:
    a) washing, salting and chopping an abomasum portion of the stomach of a ruminant;
    b) adding said washed, salted and chopped abomasum to whey and also adding grapes, salt, garlic and aluminum ammonium sulfate to the abomasum/whey mixture;
    c) storing said abomasum/whey mixture in a closed container under refrigeration; and
    d) filtering said abomasum/whey mixture to yield said culture in liquid form.

2. A process for making a culture as defined in claim 1, comprising the steps:
    a) mixing together whey, chopped ruminant abomasum, salt, garlic, aluminum ammonium sulfate and grapes in the proportions
        whey 1 liter
        abomasum about 20 to about 250 g
        salt about 1 to about 10 g
        garlic about 2 to about 20 g
        aluminum ammonium sulfate about 1 to about 10 g, and
        grapes, fresh about 10 to about 200 g or
        grapes, dried about 5 to about 100 g;
    b) storing said mixture in a closed container under refrigeration; and
    c) filtering said mixture to yield said culture.

3. A process for making a culture as defined in claim 2, wherein said whey, chopped ruminant abomasum, salt, garlic, aluminum ammonium sulfate and grapes are mixed together in the proportions:

whey 1 liter abomasum about 40 to about 200 g salt about 2 to about 5 g garlic about 3 to about 10 g aluminum ammonium sulfate about 1 to about 5 g, and grapes, fresh about 25 to about 100 g or grapes, dried about 10 to about 50 g.

4. A process for making a culture as defined in claim 3, wherein said whey, chopped ruminant abomasum, salt, garlic, aluminum ammonium sulfate and grapes are mixed together in the proportions:

whey 1 liter abomasum about 50 to about 100 g salt about 3 g garlic about 5 g aluminum ammonium sulfate about 3 g, and grapes, fresh about 50 g or grapes, dried about 25 g.

5. A process for making a culture as defined in claim 3, wherein said abomasum is from one or more of sheep, calves and mature cows.

6. A culture for the manufacture of dairy products produced according to the process defined in claim 5.

7. A process for reconstituting dated cheese comprising the steps:
   a) combining the culture defined in claim 8 with whey in a proportion of from about 1:1000 to about 1:10,000, respectively;
   b) boiling said culture/whey combination;
   c) adding to said boiling culture/whey combination a quantity of cheese to be reconstituted;
   d) heating said cheese in said culture/whey combination until said cheese obtains a desired cheese curd consistency;
   e) draining said culture/whey combination from said cheese curd; and
   f) processing said cheese curd into cheese according to conventional practice.

8. A process for producing soft curd from pasteurized milk comprising adding to pasteurized milk an effective amount of the culture defined in claim 6.

* * * * *